Patented Dec. 9, 1952

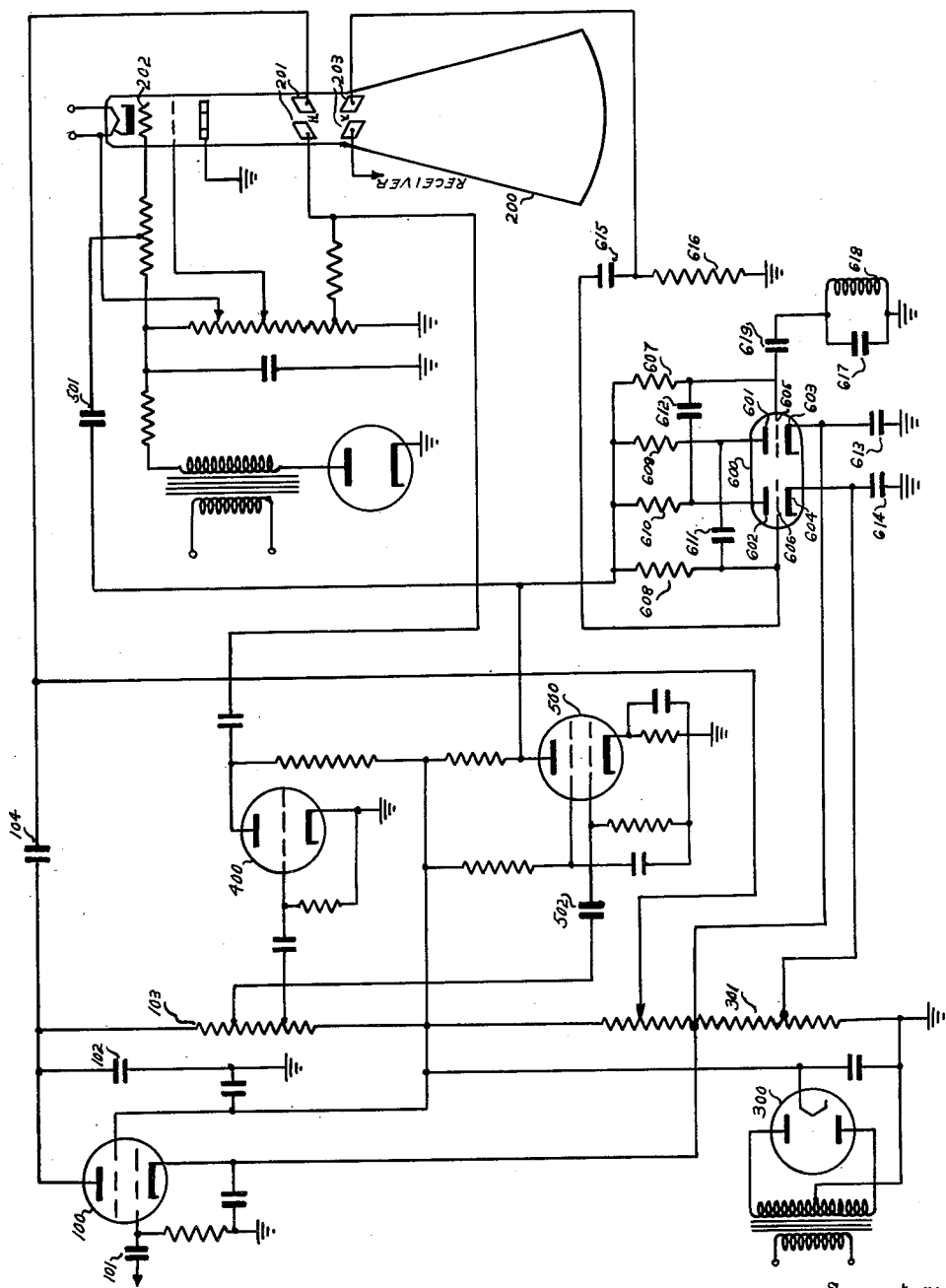

2,621,306

UNITED STATES PATENT OFFICE 2,621,306

TIME-DELAY CIRCUIT

Arthur A. Varela and Robert A. Herring, Jr., Washington, D. C.

Application August 3, 1943, Serial No. 497,272

14 Claims. (Cl. 315—24)

(Granted under the act of March 3, 1883, as amended April 30, 1928; 370 O. G. 757)

This invention relates to a system for measuring small intervals of time with great accuracy, and it is particularly directed to a time delay circuit for use in determining the elapsed time between a radio pulse transmission and return of an echo thereof.

In the measurement of small time intervals with great accuracy by electrical means, it is customary to compare the interval to be measured with a known interval by applying the intervals in the form of voltage pulses or waves to the deflecting plates of a cathode ray tube and to observe the resulting pattern or trace of the cathode ray on the screen of the tube. In the matter of radio echo ranging this method has proven to be the only practical one since the time interval between transmission and echo may be made to appear as a line segment on the screen, the length of which is a function of the elapsed time between pulse and echo, which is, in turn, a direct measure of the range of the reflecting object. A prerequisite for accurate range finding is some means of calibrating the cathode ray sweep in terms of a predetermined, accurate time interval, rather than a fixed scale mechanically fastened on the screen, so that the calibration will always be automatically adjusted to the sweep, and such a means may comprise a time delay circuit adapted to produce a sharp deflection of the cathode ray from the direction of its sweep a predetermined period of time after initiation of the sweep. For this purpose the delay circuit must be started at the beginning of the sweep cycle and designed so as to cease operation before the start of the next sweep.

This invention provides a time delay circuit which is especially suited as a marking or calibrating device for radio echo ranging apparatus. It is easily synchronized with the sweep circuit of a radio range scanning apparatus, or it may be operated by any source of pulses, periodic or aperiodic, to generate a voltage pulse a predetermined period of time after receipt of the operating pulse. The circuit is designed to provide one or more of these delayed pulses, all equally spaced in time, before ceasing operation until started again by receipt of another operating pulse. The time delay circuit is capable of very accurate adjustment of the time delay interval, and it includes simple, easy means of making this adjustment.

Briefly the delay circuit of this invention comprises a multivibrator circuit, a resonant circuit coupled thereto and a quenching means for stopping oscillation after a predetermined number of cycles. The quenching means broadly comprises a capacitance-impedance time constant circuit, and in its preferred form it includes a differential biasing means for insuring that the oscillator always starts in the proper phase (i.e. the same electronic valve is made conducting by the operating pulse).

In order that the invention may be clearly understood it is described in detail with reference to the accompanying drawing in which the time delay circuit, in its preferred embodiment, is shown connected for operation with a typical sweep circuit or scanning apparatus used in radio range finding.

Referring to the drawing, the system shown comprises a sawtooth wave generator including a tube 100, a scanning circuit including a cathode ray tube 200, a conventional power supply including a rectifier tube 300, an inverting circuit including a tube 400, a blanking circuit including a tube 500 and the time delay circuit of this invention including a twin-triode tube (or pair of electronic valves) 600. The saw-tooth wave generator is actuated by positive pulses received through a capacitance 101 from, say, the radio echo range pulse transmitter. The positive pulses cause the tube 100 to conduct and to discharge a capacitance 102 which recharges through an impedance 103, the charging potential being applied in conventional manner by the power supply. The discharging and charging of the capacitance 102 produces a saw-tooth wave having a steep negative front, which is applied to the horizontal deflecting plates 201 of the cathode ray tube 200, through a blocking capacitance 104. To produce a maximum sweep voltage, the saw-tooth wave is also used to drive an inverting circuit as a class A amplifier (the tube 400), by means of the potential drop appearing across the impedance 103. The output of the class A amplifier is applied to the deflecting plates 201 in the conventional manner shown.

In a scanning circuit of this type it is generally desirable to prevent appearance of the cathode ray trace except during the usable portion of the sweep cycle, and for this purpose the cathode ray tube 200 is maintained normally blocked by applying sufficient negative bias on the control grid 202. The bias may conveniently be furnished by the separate power supply for the tube 200, as shown. During operation, the grid 202 is unblocked by means of a positive square wave applied through a blocking capacitance 501, from the blanking circuit constructed around the tube 500. The tube 500 is normally conducting and is driven to cut-off by the negative wave front of the saw-tooth wave through a capacitance 502, thus producing a positive square wave, during the sweep, at the output of the tube 500, in conventional manner.

The time delay circuit constructed around the tube 600 is designed to be actuated by the positive pulses, or square waves, from the tube 500 inasmuch as these waves are initiated in synchronism with the saw-tooth waves used for sweeping the cathode ray across the screen. The time delay circuit comprises two electronic valves having anodes 601 and 602, cathodes 603 and 604 and grids 605 and 606. The grids 605 and 606 and the anodes 601 and 602 are connected to the source of positive potential (i. e. the positive square wave output of the tube 500) through impedances 607, 608, 609 and 610, respectively. Feedback between the anode 601 and the grid 606, and the anode 602 and the grid 605, is obtained through capacitances 611 and 612, respectively. The cathodes 603 and 604 are connected to ground through capacitances 613 and 614, respectively, and a positive bias is applied to the cathodes 603 and 604 by means of the potential drop through a power supply resistance 301, the negative end of which is grounded. Since the cathodes 603 and 604 are connected to different points on the resistance 301 a differential bias will be maintained between them, the cathode 603 being more positive than the cathode 604. Also the resistance 301 provides the direct current path to ground for the cathodes 603 and 604.

On generation of a positive square wave by the tube 500, a positive potential is applied across the cathode 604 and the anode 602, and also across the cathode 603 and the anode 601. Due to the differential bias the current first begins to flow between the anode 602 and the cathode 604, thus impressing a negative pulse on the grid 605 via the capacitance 612. This blocks any current between the cathode 603 and the anode 601, and holds the grid 605 negative until the capacitance 612 charges through the impedance 607. Then the process reverses and current flows between the cathode 603 and the anode 601, and the current between the cathode 604 and the anode 602 is blocked. In this manner the tube 600 generates a square wave in typical multivibrator fashion, the positive half of the cycle (or wave) appearing at the grid 606 through the capacitance 611 a predetermined period of time after application of positive potential to the tube 600. This positive half, being substantially a square wave, is applied to the vertical deflection plates 203 (along with the echoes from the receiver) of the cathode ray tube 200 through a differentiating circuit comprising a capacitance 615 and impedance 616 having a relatively small time constant so as to cause the wave to appear on the screen as alternate positive and negative pips, or very short pulses.

The period of the time interval depends, as in all multivibrator circuits, essentially on the time constants of the capacitance 611 and the impedance 608, and the capacitance 612 and the impedance 607.

However, the inherent instability of these circuits makes them easy to lock in with another wave of similar frequency, or a harmonic thereof. This fact is employed to adjust the period of the time delay circuit by making the multivibrator "ring" or resonate a tuned circuit comprising a capacitance 617 and an inductance 618 connected between ground and the grid 605 through a small coupling capacitance 619. The resonant circuit is preferably tuned to a harmonic of the multivibrator frequency for best control, preferably a harmonic between the second and sixth, and the fourth is preferred. By tuning this resonant circuit the period of the multivibrator, and hence the time delay between marker pulses on the cathode ray tube screen, is accurately controlled. The capacitance 619 should be quite small so as not to interfere with the frequency stability of the circuit.

It is obvious that the oscillations of the multivibrator must cease, and the circuit return to the steady state, before initiation of the next sweep, to preserve accurate calibration. This is accomplished by means of the capacitances 613 and 614 and that part of the resistance 301 which is shunted across the capacitances 613 and 614, and the time constant circuits thus formed constitute the quenching means already mentioned. When the positive potential is applied to the tube 600 and current flows through the tube, the capacitances 613 and 614 charge and eventually block further oscillation of the multivibrator. After oscillations cease the capacitances 613 and 614 discharge through the indicated part of the resistance 301. In the meantime the first square wave from the tube 500 has passed, and the multivibrator is ready to start again on receipt of the next positive wave from the tube 500. By adjusting the size of the capacitances 613 and 614 (for a given resistance 301) the multivibrator may be made to furnish one or several oscillations within one sweep period.

It is obvious that the quenching means (comprising the capacitances 613 and 614 and the resistance 301) is independent of the potential furnished by the power supply, although the potential so furnished (differential bias) serves the purpose of starting the multivibrator in the proper phase. If the differential bias is not desired, or is applied in some other way, the capacitances 613 and 614 may be combined into one (the cathodes 603 and 604 being connected together) and a single impedance of appropriate size shunted from the cathodes 603 and 604 to ground. In this respect it is not necessary to use a purely resistive impedance from cathodes to ground, but it may also be inductive, as the sole criterion is the formation of a time constant circuit having a period sufficiently in excess of the multivibrator frequency to permit the desired number of oscillations. Similarly, the impedances 607 and 608 may be returned to ground instead of to the positive potential, as is the case with the usual multivibrator circuit, although the arrangement shown in the drawing is preferred.

Many variations will be apparent to those skilled in the art, and the invention should not be limited other than as defined by the appended claims.

The invention described herein may be manufactured and used by or for the Government of the United States of America for governmental purposes without the payment of any royalties thereon or therefor.

We claim:

1. A time delay circuit comprising first and second electronic valves having cathodes, grids and anodes connected in a multivibrator circuit, a resonant circuit coupled to a grid of said first valve and tuned to a harmonic of the multivibrator frequency, quenching means connected in said multivibrator circuit whereby oscillation is stopped after a predetermined number of cycles, and differential biasing means connected to said multivibrator circuit whereby one of said valves is always caused to conduct at the instant of application of sufficient anode potential to said multivibrator circuit to cause oscillation.

2. A time delay circuit comprising first and second electronic valves having cathodes, grids and anodes connected in a multivibrator circuit, a resonant circuit coupled to a grid of said first valve and tuned to a harmonic of the multivibrator frequency, quenching means connected in said multivibrator circuit whereby oscillation is stopped after a predetermined number of cycles, and differential biasing means connected to said cathodes so that one of said valves is caused to conduct at the instant of application of sufficient anode potential to said multivibrator circuit to cause oscillation.

3. A time delay circuit comprising first and second electronic valves having cathodes, grids and anodes connected in a multivibrator circuit, a resonant circuit coupled to said multivibrator circuit and tuned to a harmonic of the multivibrator frequency, means connecting said grids through impedances to a positive potential connection in the multivibrator circuit, and quenching means comprising a capacitance-impedance time constant circuit connected between said cathodes and ground in said multivibrator circuit.

4. A time delay circuit comprising first and second electronic valves having cathodes, grids and anodes connected in a multivibrator circuit, a resonant circuit coupled to a grid of said first valve and tuned to a harmonic of the multivibrator frequency, means connecting said grids through impedances to a positive potential connection in said multivibrator circuit, quenching means connected in said multivibrator circuit whereby oscillation is stopped after a predetermined number of cycles, and differential biasing means connected to said multivibrator circuit whereby one of said valves is always caused to conduct at the instant of application of sufficient potential to said multivibrator circuit to cause oscillation, said quenching means and said biasing means comprising capacitances connected between said cathodes and ground and a resistance shunted across said capacitance and bearing a direct current potential gradient, the connections above ground potential between said capacitances and said resistances being at different points of said resistance thereby to provide a differential bias on said cathodes.

5. In an indicator system, a cathode ray tube having means generating an electron beam and an indicator screen receiving said beam, voltage generator means recurrently producing a deflection voltage on said tube for periodically sweeping said beam relative to said screen, a generator producing impulses at a frequency higher than the frequency of recurrence of said deflection voltage, electron discharge means responsive to the deflection voltage produced by said voltage generator means to initiate operation of said generator in synchronism with initiation of each sweep of the electron beam, and means applying the output of said generator to said tube to deflect said beam.

6. In an indicator system, a cathode ray tube having means generating an electron beam and an indicator screen receiving said beam, sweep means recurrently sweeping said beam relative to said screen, a generator producing impulses at a frequency higher than the frequency of recurrence of said sweep, means initiating operation of said generator in synchronism with initiation of each sweep, means applying the output of said generator to said tube to deflect said beam, and means terminating operation of said generator substantially in synchronism with termination of each sweep.

7. A cathode ray indicator comprising a cathode ray tube having means generating a beam of electrons and an indicator screen for receiving said beam, sweep means producing a voltage for deflecting said beam relative to said screen, and means operative in precise time relation with said sweep means to produce reference indications at different positions along said sweep, the last-named means including an impulse generator operative in response to the voltage produced by said sweep means for producing a series of impulses during the period of said sweep, and means deflecting said beam in accordance with said impulses.

8. A cathode ray indicator comprising a cathode ray tube having means generating a beam of electrons and an indicator screen for receiving said beam, sweep means for deflecting said beam relative to said screen, and means operative in definite time relation with said sweep means to produce reference indications at different positions along said sweep, the last-named means including a multivibrator circuit, means triggering said circuit in synchronism with initiation of said sweep, a resonant circuit controlling said multivibrator circuit to produce a plurality of impulses during the period of said sweep and means applying said impulses to said tube to deflect said beam.

9. In an indicator system, oscillographic means, means producing a timing locus on said oscillographic means, a multivibrator circuit, a resonant circuit coupled to said multivibrator circuit to control operation thereof, said resonant circuit tuned to a frequency so that said multivibrator circuit produces a plurality of impulses during the period of said timing locus, means initiating operation of said multivibrator circuit in synchronism with operation of said timing locus producing means, and means producing indications on said timing locus in accordance with the output of said multivibrator circuit.

10. In an indicator system, oscillographic means, means producing a timing locus on said oscillographic means, a multivibrator circuit, a resonant circuit coupled to said multivibrator circuit to control operation thereof, said resonant circuit tuned to a frequency so that said multivibrator circuit produces a plurality of impulses during the period of said timing locus, means initiating operation of said multivibrator circuit in synchronism with operation of said timing locus producing means, and means quenching said multivibrator circuit at substantially the instant of termination of said timing locus.

11. In combination, an oscilloscope having horizontal and vertical sets of deflecting means, a sweep circuit connected to one set of deflecting means, a multivibrator connected to the other set of deflecting means, means including an electron discharge device for rendering said sweep circuit effective, and means controlled by said electron discharge device for rendering said multivibrator effective.

12. In combination, an oscilloscope having horizontal and vertical sets of deflecting means, a sweep circuit connected to one set of deflecting means, a multivibrator connected to the other set of deflecting means, means including an electron discharge device for rendering said sweep circuit effective and ineffective, and means controlled by said electron discharge device for rendering said multivibrator effective and ineffective.

13. In combination, an oscilloscope having horizontal and vertical sets of deflecting means, a sweep circuit connected to one set of deflecting means, a multivibrator connected to the other set of deflecting means, means including an electron discharge device for rendering said sweep circuit effective and ineffective, said multivibrator comprising a pair of electron tubes each having plate, grid and cathode, means including an electron tube inter-connecting said electron discharge device and the grid of one tube of the multivibrator, means whereby said interconnecting tube places a cutoff potential on said last-named grid, and means whereby discharge of said device causes said connecting tube to render said last-named grid less negative to render said multivibrator effective.

14. In combination, an oscilloscope having horizontal and vertical sets of deflecting means, a sweep circuit connected to one set of deflecting means, a multivibrator, means for rendering said sweep circuit effective to provide a sweep, means controlled by said last-named means for rendering said multivibrator effective, means for periodically producing a plurality of cycles of the multivibrator for each sweep, and means for applying the output of the multivibrator to the other set of deflecting means whereby each cycle of the multivibrator varies the sweep.

ARTHUR A. VARELA.
ROBERT A. HERRING, Jr.

REFERENCES CITED

The following references are of record in the file of this patent:

UNITED STATES PATENTS

| Number | Name | Date |
| --- | --- | --- |
| 1,936,789 | Harmon | Nov. 28, 1933 |
| 2,293,135 | Hallmark | Aug. 18, 1942 |
| 2,338,512 | Harmon | Jan. 4, 1944 |
| 2,368,449 | Cook | Jan. 30, 1945 |
| 2,405,238 | Seeley | Aug. 6, 1946 |
| 2,434,894 | Ambrose | Jan. 27, 1948 |
| 2,448,363 | Firestone | Aug. 31, 1948 |